Aug. 20, 1957 W. H. LYON 2,803,709

KNEE ACTION PRESSURE PLATE FOR MAGNETIC TAPE RECORDER

Filed April 22, 1953 4 Sheets-Sheet 1

INVENTOR.
WILLIAM H. LYON
BY
H. G. Manning
ATTORNEY

Aug. 20, 1957 W. H. LYON 2,803,709

KNEE ACTION PRESSURE PLATE FOR MAGNETIC TAPE RECORDER

Filed April 22, 1953 4 Sheets-Sheet 2

INVENTOR.
WILLIAM H. LYON
BY
H. G. Manning
ATTORNEY

Aug. 20, 1957 W. H. LYON 2,803,709

KNEE ACTION PRESSURE PLATE FOR MAGNETIC TAPE RECORDER

Filed April 22, 1953 4 Sheets-Sheet 3

INVENTOR.
WILLIAM H. LYON
BY
H. G. Manning
ATTORNEY

Aug. 20, 1957 W. H. LYON 2,803,709

KNEE ACTION PRESSURE PLATE FOR MAGNETIC TAPE RECORDER

Filed April 22, 1953 4 Sheets-Sheet 4

INVENTOR.
WILLIAM H. LYON
BY
H. G. Manning
ATTORNEY 2,803,709

KNEE ACTION PRESSURE PLATE FOR MAGNETIC TAPE RECORDER

William H. Lyon, Orange, Conn., assignor to The Sound-Scriber Corporation, New Haven, Conn., a corporation of Connecticut Application April 22, 1953, Serial No. 350,481

6 Claims. (Cl. 179—100.2)

This invention relates to sound recording and reproducing apparatus, and more particularly to a long playing recording and reproducing apparatus in which the sound is recorded magnetically on a wide slowly moving flexible strip of tape coated on one side with an emulsion of magnetic particles.

One object of this invention is to provide a recording and reproducing apparatus of the above nature wherein a series of successive arcuate sound tracks may be impressed laterally across the moving tape by means of a plurality of electro-magnetic transducer heads radially disposed on a rotating turntable member located adjacent said tape.

A further object is to provide an apparatus of the above nature which will be simple in construction, inexpensive to manufacture, easy to install and manipulate, compact, ornamental in appearance and very efficient and durable in use.

The present invention relates to an improvement over the inventions disclosed in the co-pending application of Lincoln Thompson, Frank E. Runge and William H. Lyon, Serial Number 255,184, filed November 7, 1951, entitled "Long Playing Magnetic Tape Recorder," an application of William H. Lyon, Serial Number 284,716, filed April 28, 1952, entitled "Automatic Synchronization Apparatus for Long Time Transverse Magnetic Sound Recorder and Reproducer," and an application of Frank E. Runge and William H. Lyon, filed December 24, 1952, Serial Number 327,834, entitled "Scanning Mechanism for Magnetic Tape Recorders."

With these and other objects in view there has been illustrated on the accompanying drawings one form in which the invention may conveniently be embodied in practice.

Referring now to the drawings in which like reference numerals denote corresponding parts throughout the several views.

The numeral 10 indicates a cabinet for housing the mechanical operating mechanism, said cabinet having a chassis 11 on which is mounted an angular tape controlling gate 12, including a horizontal block 13 having a vertical arm 13*a* depending therefrom.

Figure 2:
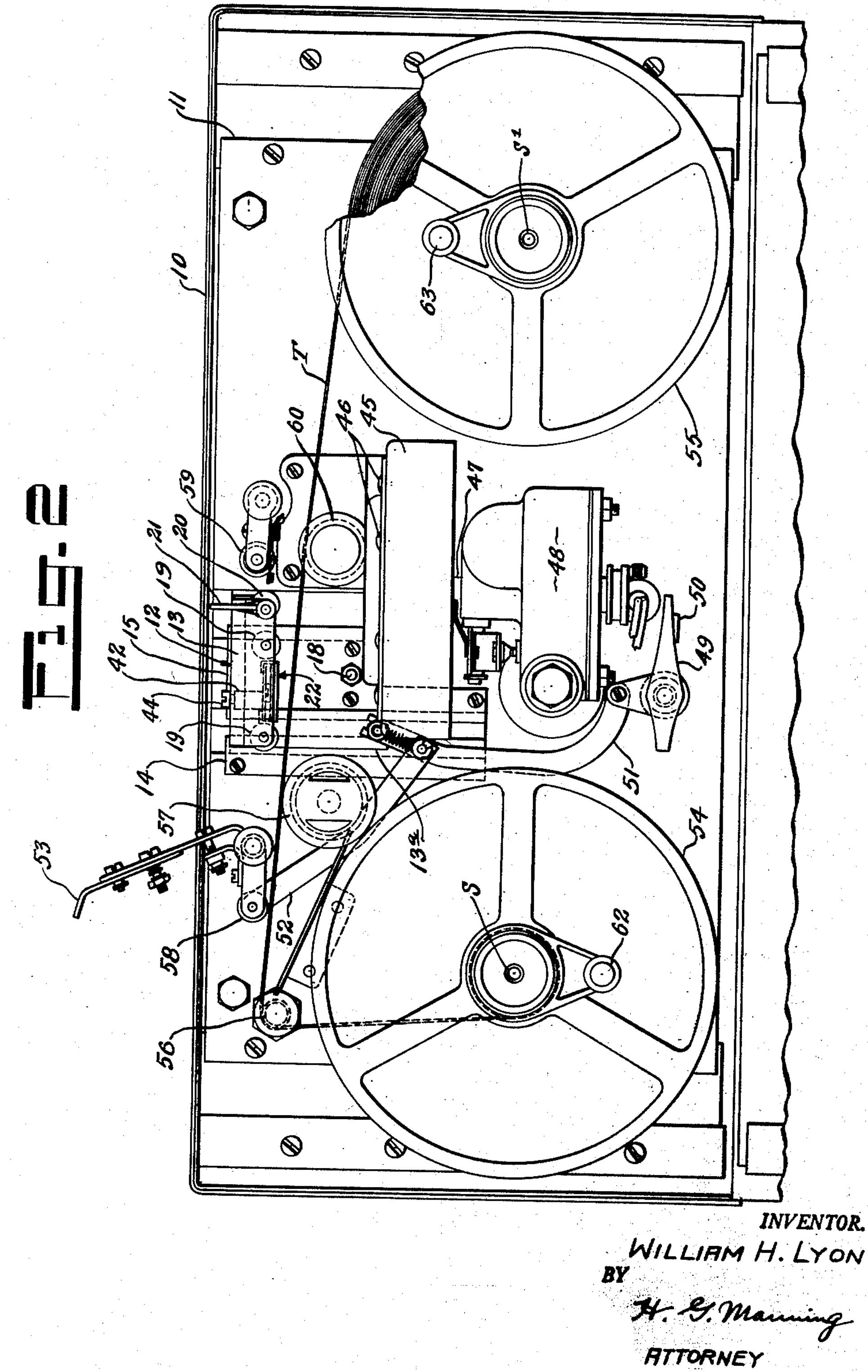
Fig. 2 is a similar view of the same, with the gate raised into tape loading position.

The arm 13*a* is adapted to be secured to a pair of vertical ways 14 and 15 attached to the chassis 11, which have a sliding engagement with a pair of vertical plates 16 (Fig. 5) secured to the block 13. The height of the block 13 may be adjusted for best operation by means of vertical adjusting screw 17 (Figs. 3 and 5) the lower end of which is adapted to engage a horizontal stop screw 18 (Fig. 2).

In order to cause the magnetic tape T to pass automatically through the recording apparatus, provision is made of a pair of horizontal spindles S and S1, upon which are mounted a feed reel 54 and a take-up reel 55 respectively.

The tape controlling gate assembly 12, which forms the basis of the present invention, is located between the two reels 54 and 55, and means are provided for guiding the tape T from the reel 54 over a guide spindle 56, under a tapered roller 58, over a guide drum 57, and horizontally under the gate block 13. The tape then passes over a drive roller 60 and under a pressure roller 59 at the other side of the gate 12, from which it passes to the take-up reel 55.

In order to permit manual winding of the tape from the feed reel 54 to the take-up reel 55, and vise versa, provision is made of a pair of handles 62, 63 located on the front of said reels.

The pressure gate block 13 is provided with a pair of horizontal parallel bottom rollers 19, 19, and an eccentric roller 20 having an adjusting handle 21 to permit the tracks recorded on the tape to be synchronized with the paths of the rotating recording heads 46, during reproduction, as has been fully described in the three prior applications mentioned above.

Figures 4, 7:
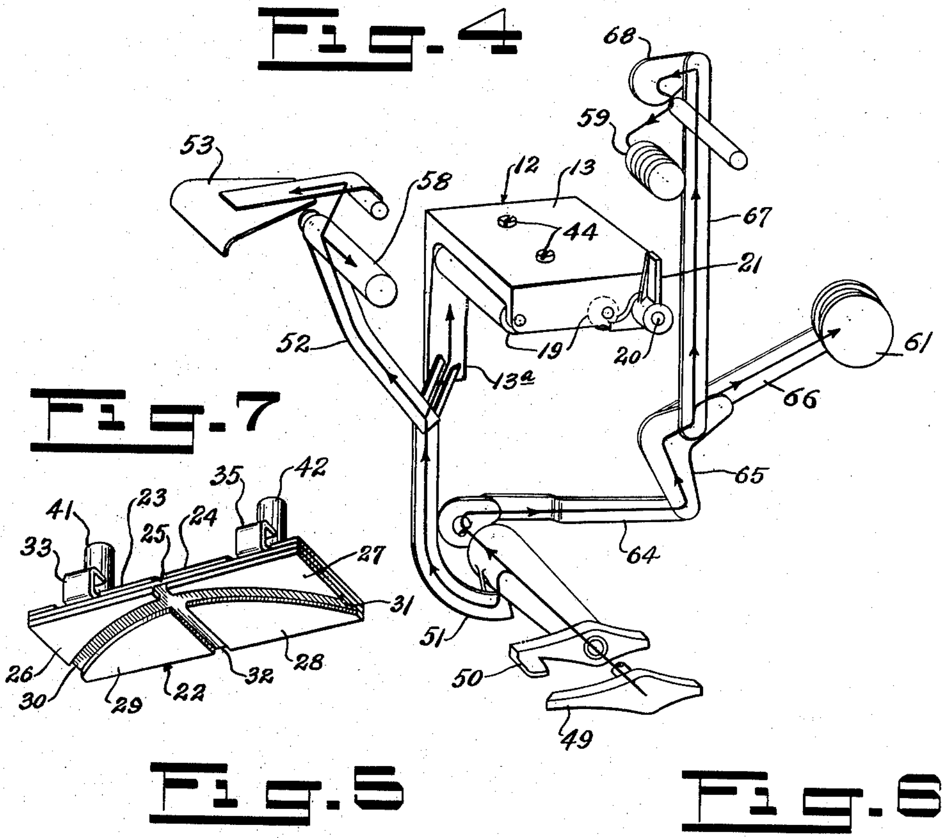
Fig. 4 is a perspective view of the mechanical linkages for controlling the operations of loading, recording, reproducing, and scanning.
Fig. 7 is a perspective bottom view of the pressure plate, shown by itself in perspective.
Figure 5:
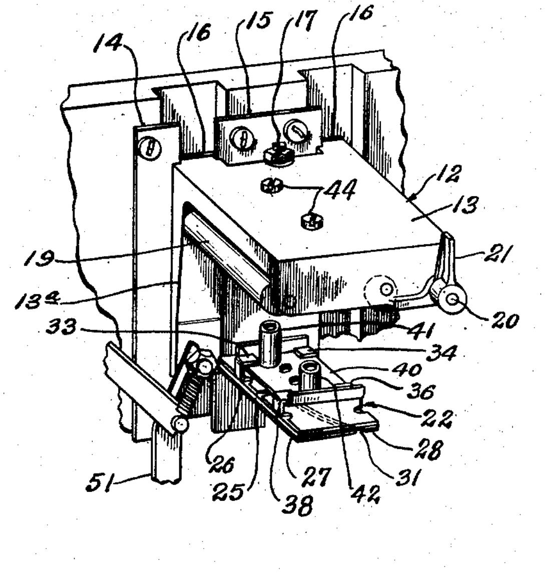
Fig. 5 is a perspective view on an enlarged scale of the tape controlling gate, with the pressure plate lowered to show the interior construction thereof.
Figure 6:
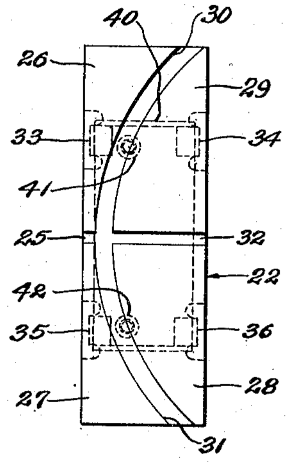
Fig. 6 is a detail plan view, on an enlarged scale, of the pressure plate, showing the curved gaps through which the rotating magnetic heads of the turntable pass during recording and playback.

Provision is also made of a pressure plate 22 (Fig. 5) which includes a pair of upper rectangular flat sections 23 and 24, secured as by cement to a reinforced rubber strip 25, the lower surface of which has cemented thereto four substantially triangular segments 26, 27, 28, 29, preferably made of stainless steel, the segments 26, 27, 28, 29 being spaced apart by means of a pair of curved longitudinal grooves or gaps 30, 31 and a cross gap 32, as clearly shown in Figs. 6 and 7.

Figure 3:
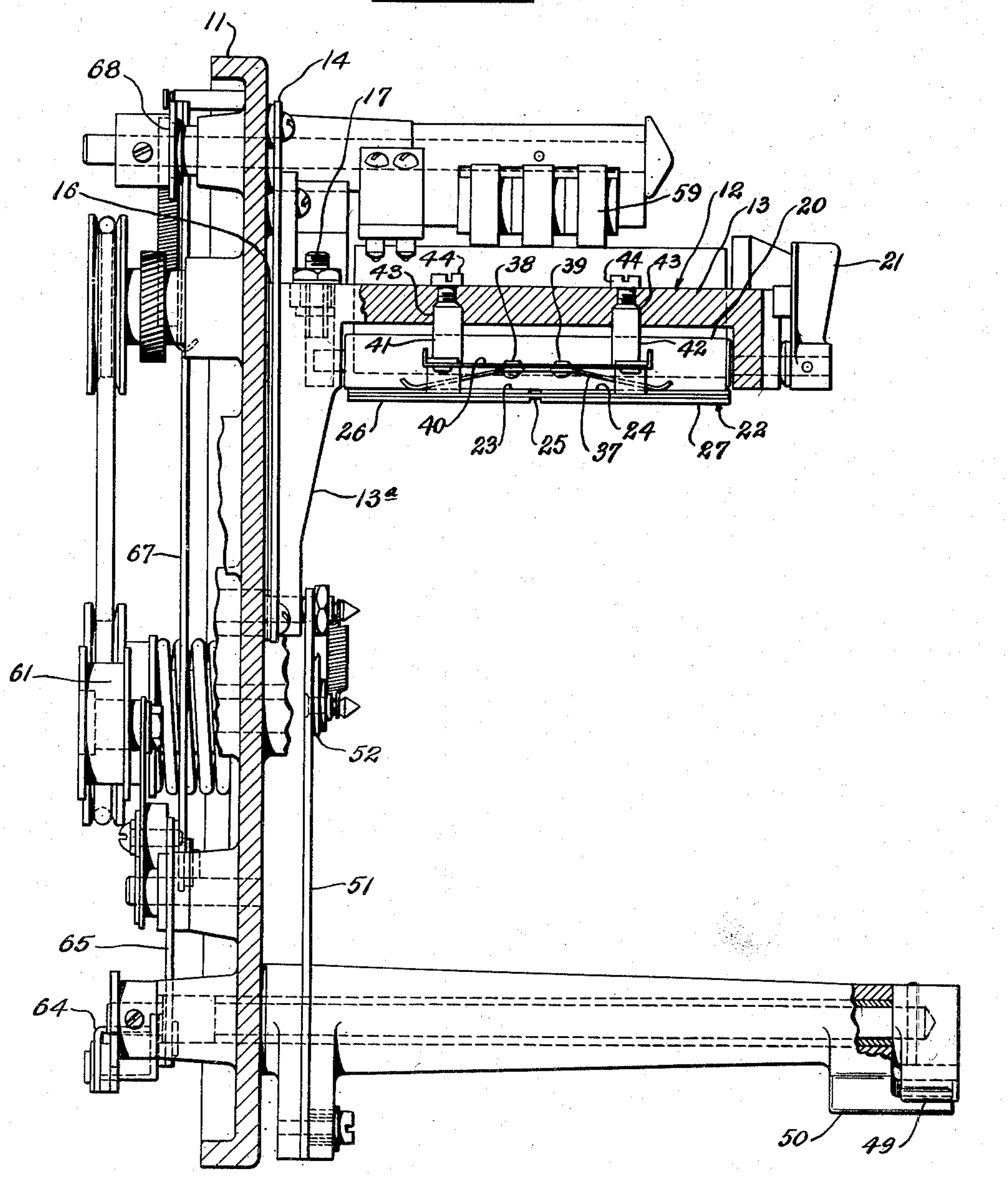
Fig. 3 is an enlarged transverse sectional view taken on the line 3—3 of Fig. 1, showing details of the gate, the bottom load lever, and associated parts.

The rectangular upper sections 23, 24 have four upstanding side hooks 33, 34, 35, 36 which are bent inwardly at their top ends to embrace a rectangular bracket plate 40, as clearly shown in Figs. 3 and 5.

The bracket plate 40 is provided with a double arm leaf spring 37 (Fig. 3) secured thereto as by rivets 38, 39 which presses each half of the pressure plate 22 against the rectangular supporting sections 23 and 24 and the upper surface or back of the tape T.

The bracket plate 40 is provided with a pair of upstanding studs 41 and 42 which are adapted to be received within sockets 43, 43 found in the gate block 13 above said studs as most clearly shown in Fig. 3. The studs 41, 42 are rigidly secured in the sockets 43, 43 by means of a pair of upper-headed screws 44 passing downwardly through the gate block 13.

Provision is made of a rotatable turntable shell 45 having eight magnetic transducer heads 46 mounted therein, as disclosed in the previous applications, above referred to. This construction permits the simultaneous recording and reproducing of a pair of signals, the tracks of which alternate with each other on the tape T.

The turntable 45 is mounted upon a vertical spindle 47 and is driven by means of a motor, not shown, through a drive gear box 48.

Figure 1:
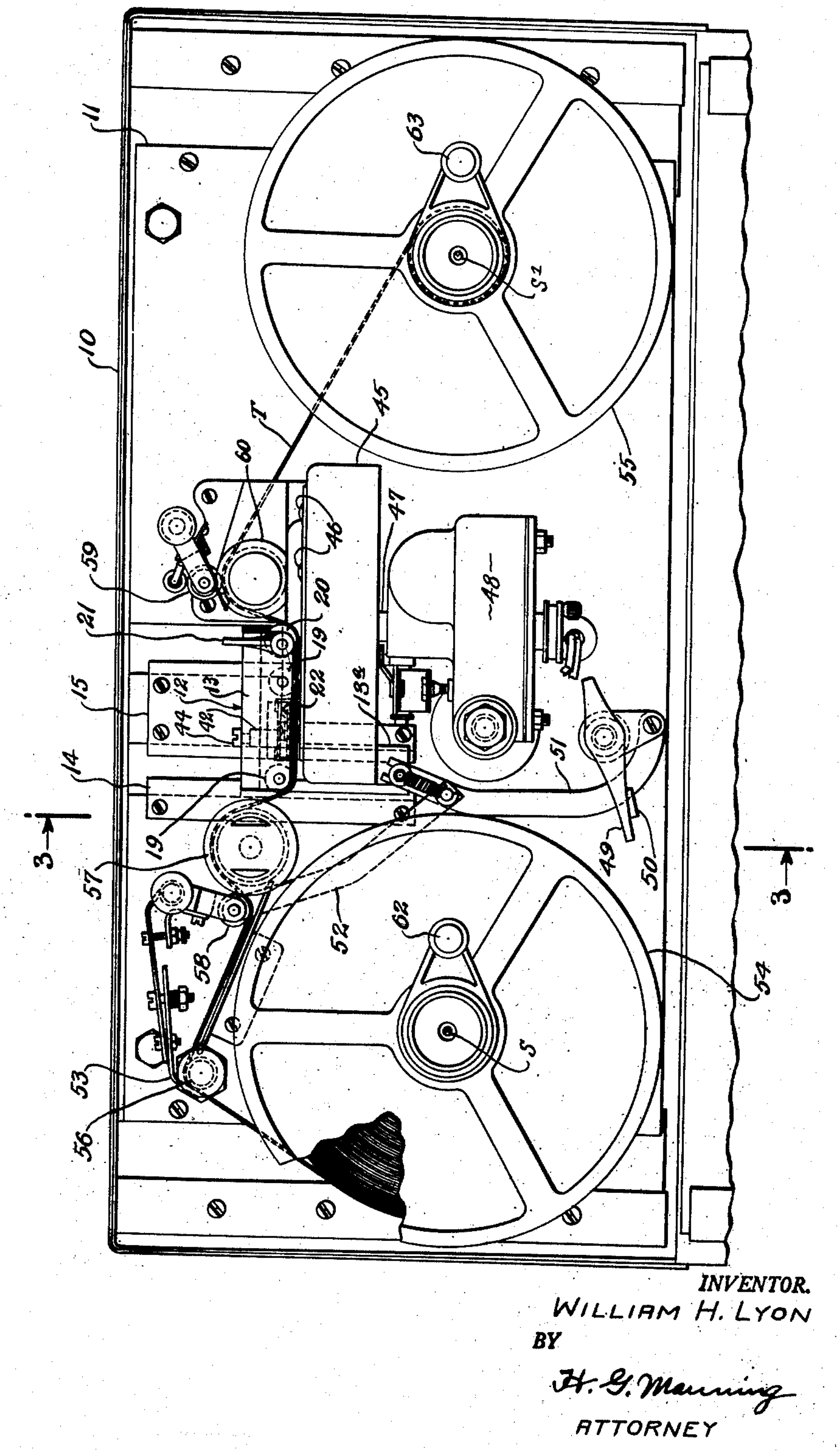
Fig. 1 represents a front view, in elevation, of the improved magnetic recorder and reproducer showing the tape controlling gate lowered into recording position.

The magnetic recorder-reproducer herein disclosed is controlled by means of a scan lever 49 and a load lever 50, as fully described in said prior applications. The levers 49, 50 operate the controlling elements of the mechanism through a curved link 51, a curved link 52, a link 64, a bellcrank lever 65, a take-up arm 66, a link 67, a crank 68, connected to the operating parts (as clearly shown in Figs. 1, 2 and 4) which actuate the pressure roller 58, a tape tension shoe 53, the pressure roller 59 and the gate 12, as well as the take-up roll belt tension roller 61 (Figs. 3 and 4).

*Operation*

The function of the pressure plate 22 is to hold the magnetic tape T in intimate contact with the recording heads 46 of the turntable 45, with a constant pressure at all times.

In previous magnetic recorders, it has been customary to employ a soft material such as felt, to press against the top of the tape opposite the points of contact of the recording heads. The disadvantage of this construction was that the felt material wore out quite rapidly and frequently caused the tape to chatter, modulating the signal in an undesirable manner.

By means of the present invention the tape will be held in intimate contact with the head, without a physical backing of any sort, opposite the point of contact with the magnetic heads.

In other words, the present invention utilizes the natural compliance of the tape itself to hold it against the magnetic heads, which would not be possible with a metal backing having insufficient flexibility.

After the tape is loaded, the gate 12 will be pulled down into recording position by the manipulation of the "scan" and "load" levers 49 and 50. The rollers 19 will then contact the upper surface or back of the tape T, and will force it down into contact with the tips of the recording heads 46 which revolve continuously with the turntable 45. Thus, the location of the pressure plate 22 within the gate 12 insures an even pressure of the tape T against the heads 46 at all times.

The cross gap 32 permits the pressure plate 22 to flex at the center, so that equal pressures will be applied to three heads 46 simultaneously, and preventing the possibility of said heads getting out of contact with the tape.

The longitudinal curved gaps 30, 31 provide a free air space above the portion of the tape which is in contact with the heads, where the sound tracks are being recorded or reproduced. These gaps 30, 31 are made somewhat wider than the diameter of the transducer heads 46 and prevent them from contacting the segments 26, 27, 28, 29.

While there has been disclosed in this specification, one form in which the invention may be embodied, it is to be understood that this form is shown for the purpose of illustration only, and that the invention is not to be limited to the specific disclosure, but may be modified and embodied in various other forms without departing from its spirit. In short the invention includes all the modifications and embodiments coming within the scope of the following claims.

Having thus fully described the invention what is claimed as new and for which it is desired to secure Letters Patent is:

1. In an apparatus for magnetically recording intelligence upon and reproducing it from a movable flexible magnetic tape, a chassis, a feed reel and a takeup reel mounted on said chassis, means for advancing said tape through said apparatus, a depressible pressure block located above said tape, a continuously rotating turntable carrying a plurality of equally spaced transducer heads around the circumference thereof located below said tape, said pressure block including a vertical arm having slidable engagement within a pair of smooth vertical plates secured to the chassis of said apparatus, and means upon said block to resiliently press said tape into contact with said transducer heads successively as said turntable rotates, said block having a height adjusting screw mounted therein and a stop member on said chassis for engaging the lower end of said screw.

2. The invention as defined in claim 1, in which said block has a pressure plate supported thereby, said pressure plate having a pair of top rectangular sections provided with upstanding inturned hooks embracing an upper bracket plate secured to said block by means of vertical studs, the bottom of said pressure plate having a series of flexibly mounted smooth triangular metallic segments for engaging the top of said movable tape, said segments loosely embracing said heads without having contact therewith.

3. The invention as defined in claim 2, in which said top rectangular sections are secured to said bottom triangular segments by a laminated reinforced rubber fabric strip.

4. The invention as defined in claim 2, in which said triangular segments are spaced apart by a pair of gaps having a curvature concentric with the axis of said turntable, and within which the heads of said magnetic recorder are adapted to pass, and having a cross air gap at the central portion thereof to avoid chatter and undesirable modulation.

5. The invention as defined in claim 2, in which said block carries a bottom arched leaf spring having its opposite ends pressing downwardly upon the segments of said pressure plate.

6. In an apparatus for magnetically recording intelligence upon and reproducing it from a movable flexible magnetic tape, a chassis, a feed reel and a take-up reel mounted on said chassis, means for advancing said tape through said apparatus, a depressible pressure block located above said tape, a continuously rotating turntable carrying a plurality of equally spaced transducer heads around the circumference thereof located below said tape, said pressure block including a vertical arm having slidable engagement within a pair of smooth vertical plates secured to the chassis of said apparatus, and means upon said block to resiliently press said tape into contact with said transducer heads successively as said turntable rotates.

References Cited in the file of this patent

UNITED STATES PATENTS

| | | |
|---|---|---|
| 2,245,286 | Marzocchi | June 10, 1941 |
| 2,648,589 | Heckman | Aug. 11, 1953 |